(12) United States Patent
Gordon et al.

(10) Patent No.: US 9,406,024 B1
(45) Date of Patent: Aug. 2, 2016

(54) SYSTEM AND METHOD FOR COLOR PAINT SELECTION AND ACQUISITION

(71) Applicant: International Business Machines Corporation, Armonk, NY (US)

(72) Inventors: Michael S. Gordon, Yorktown Heights, NY (US); James R. Kozloski, New Fairfield, CT (US); Peter K. Malkin, Yorktown Heights, NY (US); Clifford A. Pickover, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/618,503

(22) Filed: Feb. 10, 2015

(51) Int. Cl.
*G06N 5/04* (2006.01)
*G06N 99/00* (2010.01)

(52) U.S. Cl.
CPC ............... *G06N 5/04* (2013.01); *G06N 99/005* (2013.01)

(58) Field of Classification Search
None
See application file for complete search history.

(56) References Cited

U.S. PATENT DOCUMENTS

| | | | |
|---|---|---|---|
| 5,841,421 A | 11/1998 | Cheetam et al. | |
| 6,583,880 B2 | 6/2003 | Berstis | |
| 8,063,912 B2 | 11/2011 | Reynolds et al. | |
| 8,423,080 B2 | 4/2013 | Linjama et al. | |
| 2009/0183122 A1* | 7/2009 | Webb | G01J 3/02 715/840 |
| 2011/0029401 A1 | 2/2011 | Granger et al. | |
| 2012/0290430 A1 | 11/2012 | Hershenson | |
| 2013/0027404 A1 | 1/2013 | Sarnoff | |
| 2013/0041858 A1* | 2/2013 | Fujieda | G01J 3/46 706/20 |
| 2014/0096009 A1* | 4/2014 | Grosz | G06F 3/0484 715/733 |

OTHER PUBLICATIONS

Rodriguez et al., "Color Recommendation System Combining Design Concepts with Interactive Customers Preference Modeling from Context Changes", 2010, IEEE.*
List of IBM Patents or Patent Applications Treated as Related.
(Continued)

*Primary Examiner* — Alan Chen
(74) *Attorney, Agent, or Firm* — Scully, Scott, Murphy & Presser, P.C.; Louis J. Percello, Esq.

(57) ABSTRACT

A system and method and computer program product for paint color recommendation. The system obtains measures of an environment to be painted and trains a learned model to input data received from customers including data representing each customer's initial color paint and pigment selection, and one or more of: a customer perceptual, a customer context, and environment measure (P/C/E data) to generate a sparse matrix. One or more paint vendors may then use the generated sparse matrix to determine a color pigment recommendation from a pigments color space for a customer. From a user selected color/pigment, and using the learned model, the system maps the selection, together with the user's P/C/E data back to the color/pigments space. User feedback representing a degree of satisfaction that the recommended color pigment applied to the user environment has matched the user's initial color paint and color pigment selection is elicited.

17 Claims, 7 Drawing Sheets

(56) References Cited

OTHER PUBLICATIONS

Konieczny, "Application, Rendering and Display of Automotive Paint", Dissertation Abstracts International, vol. 7012B, Nov. 2009, University of Minnesota, Doctoral Thesis—p. 7669, 145 pages.

IPCOM000818212D, Disclosed Anonymously, "Manipulate Pictures on Mobile Device", Nov. 29, 2011.

Adby, "Choosing the Right Colour", Polymers Paint Colour Journal (UK), 2011 201/4559 (38-39), DMG World Media (UK) Ltd., Apr. 1, 2011.

"Social Network Analysis (SNA) Diagrams", Sentinel Visualizer, Social Network Analysis (SNA) Software with Sentinel Visualizer Diagrams, http://www.fmsasg.com/SocialNetworkAnalysis/, last printed Jan. 29, 2015, pp. 1-3.

Rasmussen et al., "A tutorial on the Lasso approach to sparse modeling", Chesmometrics and Intelligent Laboratory Systems 119 (2012) 21-31; Received Dec. 13, 2011; Available online Oct. 13, 2012.

* cited by examiner

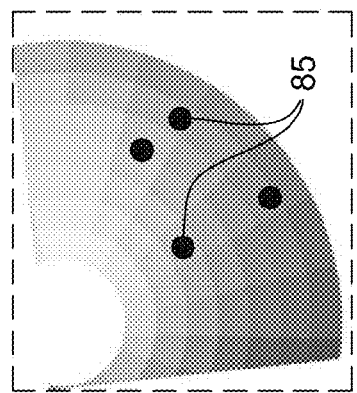
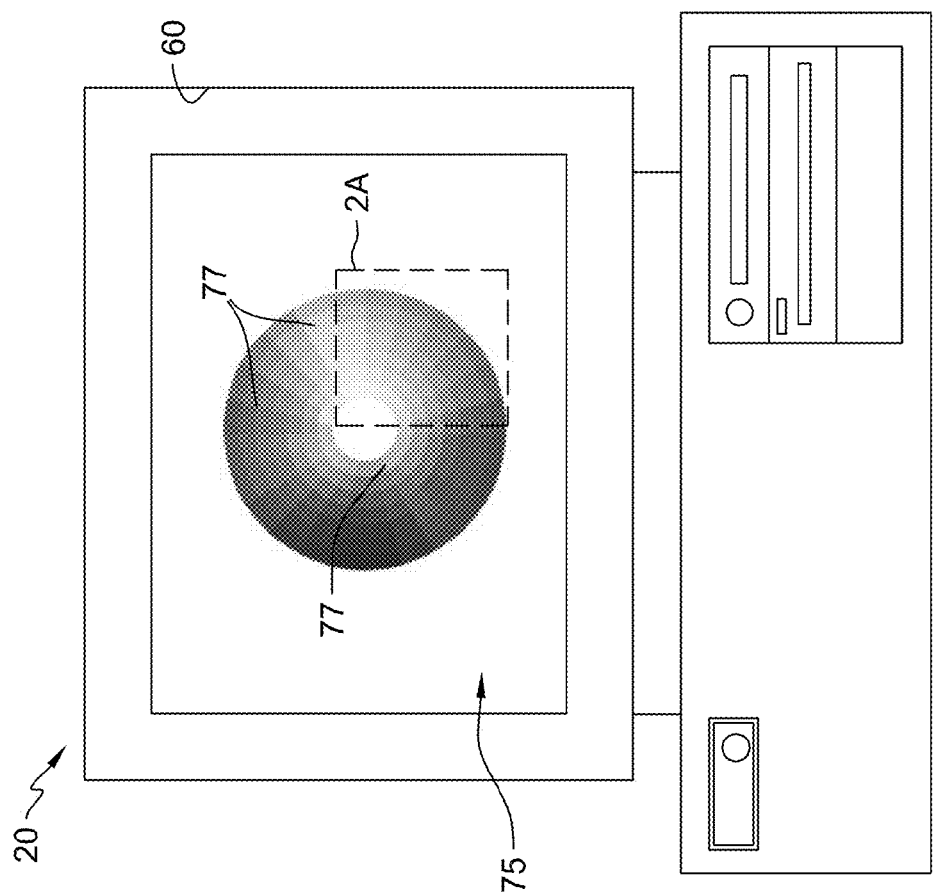

SYSTEM AND METHOD FOR COLOR PAINT SELECTION AND ACQUISITION

FIELD OF INVENTION

This disclosure relates generally to a method of selecting paint colors, e.g., at a paint vendor, or paint department of a store, and an automated solution for paint selection and recommendation based on the environment to be painted and contextual factors pertaining to the consumer.

BACKGROUND

It is the case that "a human's perception of colors is a subjective process whereby the brain responds to the stimuli that are produced when incoming light reacts with the several types of cone photoreceptors in the eye. In essence, different people may see the same illuminated object or light source in different ways".

For example, in the case of painting a room or environment using a color selected when at a paint department at the Home Depot department store, this human color perception phenomena often leads to a phenomenon after painting the room or environment wherein the customer says "this looks nothing like the color sample viewed at Home Depot".

Thus, in the case of selecting a color, e.g., of a paint used for painting a room or environment, this human color perception (percept) phenomena engenders a problem: how to assist a user in making decisions about colors based on the context of the room or environment and the perceptual apparatus in which the color will emerge as a subjective experience or quale of consciousness.

There is no current system or method to assist a user who is desirous of procuring a paint color for painting a room or environment in making a paint color selection that matches the expected subjective percept of that color.

From the viewpoint of a paint vendor or service entity, paint store, or paint department that recommends and/or procures paint of a desired color and pigment, it would be desirable to provide an effective and consistent method that enables a user or paint vendor to make informed decisions regarding paint color selections for consumers.

SUMMARY

A system, method and computer program product to sufficiently obtain measures of an environment to be painted and map measures of the environment to be painted, the user's perception of different colors, and the cognitive context of the user, into a space of desired colors, and then into a space of pigments specifically chosen to produce this color in a targeted cognitive and environmental context.

Because the number of measures will far exceed the number of observed percepts or preferences of any given user, a system and method is proposed which performs a sparse regression from measures into a standard color space such as a color wheel, targeting these colors with pigments and base paints that the system learns are capable of generating the desired color in the environment.

In one aspect, a paint color recommendation system for multiple paint vendors is provided. The system comprises: a memory storage device storing a program of instructions; a processor device receiving the program of instructions to configure the processor device to: receive input data representing an initial paint color or pigment selection from a user; receive further input data representing one or more of a user's perceptual/cognitive/environmental (P/C/E) context; map, using a learned model, the user's initial color paint and color pigment selection and user context data to a pigments color space; determine, based on the map, a color pigment or pigment mixture for recommendation to the user; and communicating data representing the color pigment or mixture recommendation to a user designated device.

In a further aspect, there is provided a paint color recommendation method for a color paint vendor. The method comprises: receiving, at a processor device, input data representing an initial paint color or pigment selection from a user; receiving, at the processor device, further input data representing one or more of a user's perceptual/cognitive/environmental (P/C/E) context, a user's environmental context associated with an environment in which the selected paint color is to be applied to a surface thereof; mapping, using a learned model, said user's initial color paint and color pigment selection and user context data to a pigments color space; determining, based on said map, a color pigment or pigment mixture for recommendation to the user; and communicating data representing said color pigment or mixture recommendation to a user designated device.

In a further aspect, there is provided a computer program product for performing operations. The computer program product includes a storage medium readable by a processing circuit and storing instructions run by the processing circuit for running a method. The method is the same as listed above.

BRIEF DESCRIPTION OF THE DRAWINGS

These and other objects, features and advantages of the present invention will become apparent from the following detailed description of illustrative embodiments thereof, which is to be read in connection with the accompanying drawings, in which:

FIG. 2 depicts an example presentation to a user on a display interface of a color wheel that maps a user selected color to unique combinations of paint color and color pigments in one embodiment;

FIG. 2A depicts a zoomed-in portion of the color wheel showing a user selection of one or more colors as an example initial color paint and pigment selection;

DETAILED DESCRIPTION

Figure 1:
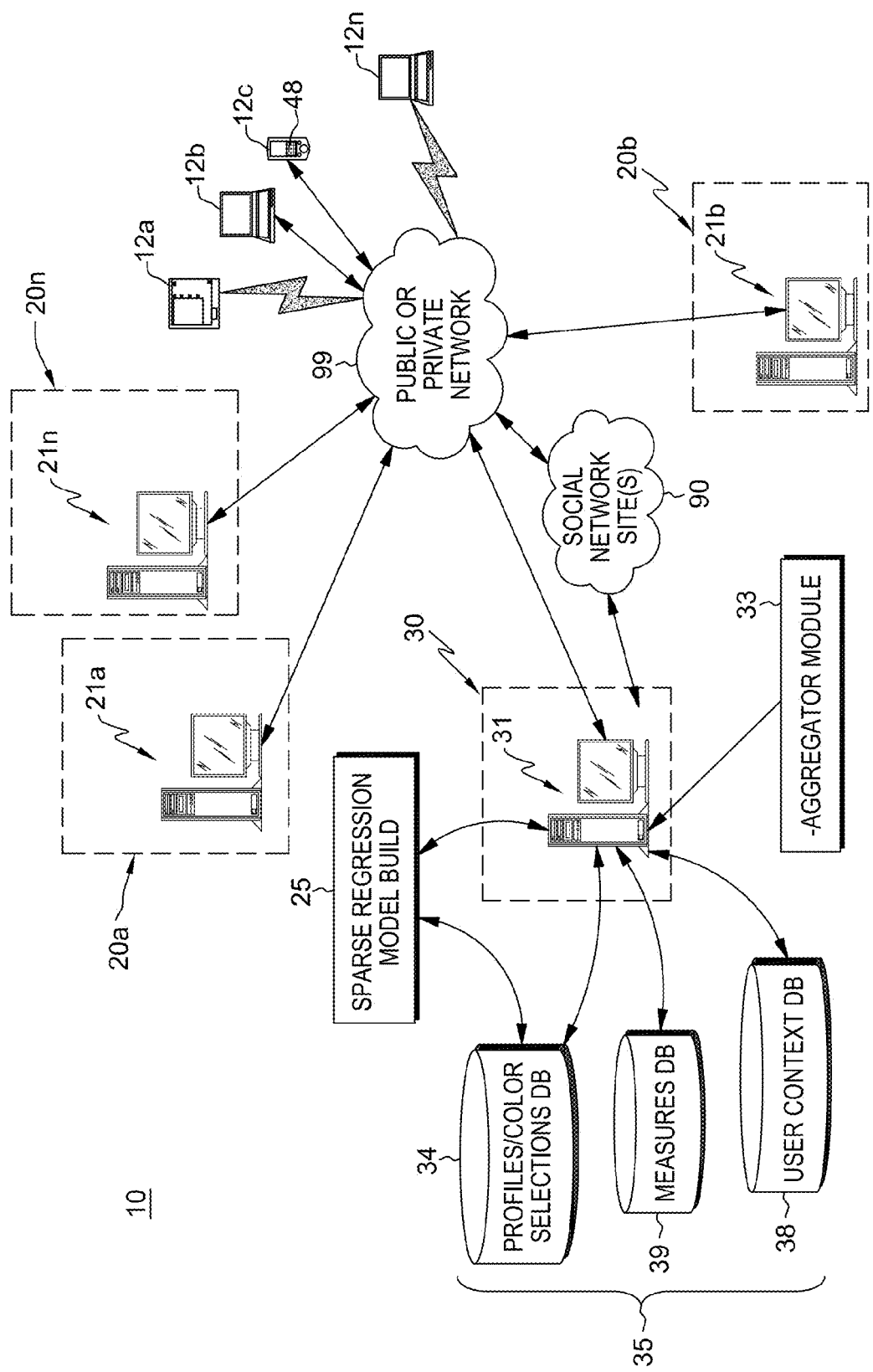
FIG. 1 shows conceptually a "trans-vendor" paint color recommendation system, method and tool for providing more accurate paint color selections and recommendations for a user.

As shown in FIG. 1, there is provided a "trans-vendor" service, method and tool 30 for providing paint color selections and recommendations for a user (e.g., a paint customer). The trans-vendor service is not specific to any one particular commercial paint vending entity, but is able to service multiple paint vending commercial entities with a common interface, design patterns and cloud service. The service builds machine learning input sets for use and benefit by all commercial participating paint vending store entities, to provide more accurate correct color choices or recommendation to customers with decreased likelihood of color selection dissatisfaction.

In particular, FIG. 1 shows a conceptual "trans-vendor" service 10 for color paint selection/recommendation and a tool 30 that may be implemented by many commercial entities, e.g., participating paint vending stores 20a, 20b, ... 20n that provide paint to customers, consumers, contractors or like users. In one embodiment, each participating paint vending store 20a, 20b, ... 20n may provide a common controlled environment or area in which a user, e.g., paint consumer, will be enabled to make a paint color selection.

In one embodiment, a consumer may visit a paint service vendor, and may select to volunteer and participate in an offered paint color recommendation service, at which time a representative of the participating vendor client may place the user in a consistent viewing environment, e.g., a controlled environment such as a kiosk, having a consistent viewing environment with a particular lighting, background color(s), etc. In these conditions, and the user will be provided with a "paint chip" (e.g., a card that paints stores often provide customers for choosing a paint color, a color wheel, object or display) in which colors/pigments are shown for selection, and under the carefully controlled condition, provide a paint color/pigment selection.

In one embodiment, each participating paint vendor entity premises 20a, 20b, ..., 20n may provide a respective computer system 21a, 21b, ..., 21n with an interface via which the user will enter further information for the service. As color is not an objective measure or phenomena and is a subjective percept, the additional information includes user profile data and contextual/measures data pertaining to the user's context of viewing the room and environment to be painted. The context data and environment measures data provided by the user is stored by the service and used to build, using machine learning, a model for paint color/pigment selection and/or recommendation. Each user's paint selection and contextual data may be entered via a web-browser or browser-based application, and is communicated from the vendor premises via a respective Internet or web-connection to a centralized trans-vendor service 30 embodied as a computing system 31 that includes one or more web/database servers comprising application and database software components for building the model for color/pigment selection and/or recommendation and associated web-service. Received user profile data is stored in a memory storage device, e.g., a database 34, for association with that user's particular color/pigment selection. Received for additional association with that user's particular color selection is the user's associated contextual data that the user enters or communicates via the particular paint vendor service premises 21a, ... 21n, or subsequently remotely via a user device. These contextual data includes contextual measures, e.g., for storage in a measures database 38, and environment measures, e.g., for storage in a measures database 39. While several memory storage devices 35 are shown, it is understood that the user profile/context information may be consolidated for storage in a single storage device for access by a database program.

Alternatively, subsequent to a user's paint color/pigment selection at a vendor, the data representing the user context and user environment measures data associated with the particular selection may be obtained and subsequently communicated via the web or Internet from a location external to the vendor premises to the centralized computing system 31 providing the trans-vendor service tool 30. For example, users of the web-based paint recommendation service 10 are enabled to access the service tool 30 remotely via wired or wireless connections from a user device 12a, ..., 12n, e.g., a smartphone, laptop, mobile or desktop computer, to the computing system 31 via a respective to the Web/Internet or a like public/private network connection. It is understood that wired communications between the web site computing system 31 and the registered users are via the public Internet in accordance with standard TCP/IP protocols and optionally, over a secure communications link, e.g., secure sockets layer, or similar protocol. It is understood that parties 12a, ..., 12n may access the Web/Internet via a personal computer/computing device, personal digital assistant, or like device implementing web-browser functionality, e.g., Google® Chrome®, Safari®, Internet Explorer®, or other browsing technology that may be compatible.

In one embodiment, at the vendor premises, the user may queried to enter, e.g., via the computer interface, that user's profile information, e.g., the user context such as the user's gender (male/female), age, marital status, etc., and may be presented with a questionnaire which obtains the user context, e.g., desired room color, the type/use of the room to be painted, the environment of the room (e.g. amount/duration of sunlight), the furniture type and color that is present in the room to be painted, and any other data point that might bear on the user's subjective color percept for further training the system.

Further, the user may be presented with a paint chip(s) having palettes of colors from which the user may select. For example, FIG. 2 shows an example "paint chip" in the form of a color wheel 75 that is electronically generated and presented for display on a computer display device 60 at the paint vendor premises or store for a user to select a color/pigment. The color wheel 75 includes paint selection colors or "base" paint colors 77. As known, each color selection 77 has a unique mapping to a set of pigments and a base paint color (of a standard color space) that is used in the vendor compute system to mix the paint to procure the selected paint color. As the pigments and paint combination may look different once applied at the user's environment, in one embodiment, the trans-vendor tool takes this particular user's context and enters the information in a model that provides a paint color/pigment selection or recommendation that better reflects that user's subjective color percept.

It should be understood that any type of color presentation, e.g., often-used color wheels or paint chips, may be displayed, and these color wheels/paint chips may be provided free, or for a fee, to members of a social network, a professional designer, for derivation of an aggregate assessment from a social network, from a professional designer, etc. Similarly, a color wheel may indicate most-often used color classes or most preferred color classes, as provided by an aggregator module (AM) with access to a user's social network. Aggregation involves the aggregation of color selection information, given several types of user context, as will explained in greater detail herein, represented in a preferred embodiment as a centroid of points selected by different individuals on a color wheel. This centroid is calculated according to standard formulae, and provides a means to find the average color selection by members of a social network, given the several types of user context. In one embodiment, user context includes: user color Percept data, user cognitive Context data, and Environment measures data of the room or environment to be painted (referred to herein as "P/C/E data"). A second step of aggregation occurs when color selection is mapped to paint pigments. This mapping, depends on machine learning over the color selection and P/C/E context itself, and may differ depending on the user. The estimate P/C/E for a given user may, therefore, take into account an aggregate P/C/E. For example, given uncertainty about P/C/E for a new user of the system, the average of P/C/E employed by other users of the system (from the user's social network, from the user's trusted expert advisors, etc.) may be used.

For example, as shown in the system diagram of FIG. 1, an AM 33 may be a process associated with the system tool 30 that has access to color preferences of people in a user's social network, such as friends and family. The identification of members in a social network may be performed by an analysis (with users' permissions) of posts to social media, emails, LinkedIn® connections, etc. For example, three of a user's friends may indicate that teal, or a variant of teal, is their favorite color. Optionally, they may specific other characteristics associated with colors, including names of paint vendors, paint glossiness, etc. The AM 33 may tally such preferences. For example, the AM 33 may identify that 60% of members in a user's social network like various shades of blue, or that they prefer a range of hues in a particular region of color space. Users may indicate such preferences in a direct fashion, or such preferences may be estimated (with a certain confidence level) by an analysis of user photos of their homes or other images. In one embodiment, this feature may be performed in an opt-in fashion, so as not so sacrifice user privacy.

In a first aspect, based on the received data and initial user color choices, the system and method implemented at tool 30 generates a mapping model sufficient to map measures of the environment to be painted, the user's perception of different colors, and the cognitive context of the user, into the space of desired colors and then into the space of pigments specifically chosen to produce this color in a targeted cognitive and environmental context. This model is made available and accessible by many paint vendors 21a, . . . 21n for their use in increasing satisfaction levels for their customer's color paint purchases.

Figure 3:
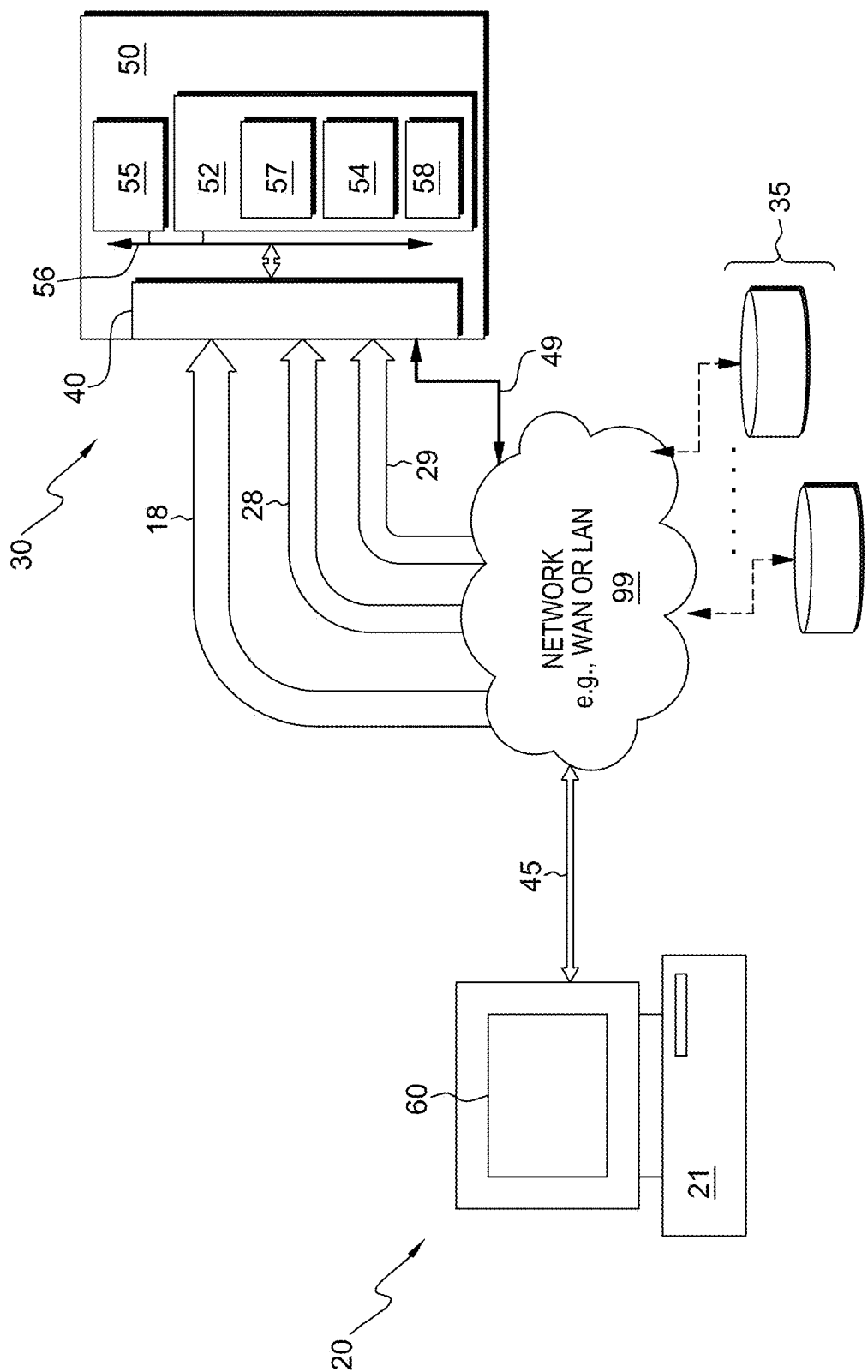
FIG. 3 is a diagram depicting system software components of a trans-vendor color paint recommendation tool employing the methodology according embodiments herein.

FIG. 3 depicts a more detailed software block diagram of the tool 30 in which the inventive color paint recommendation model is developed and used. The tool 30 is particularly an apparatus including a computer system 50, e.g., a desktop or laptop computer, a mobile device, a server, etc. having at least a memory storage device 52, e.g., main memory and/or a cache, and a hardware processor or like computation device 55 coupled to the memory, e.g., via a data and address bus 56, wherein the processor device 55 is configured to execute computer program code to perform the methodologies for paint color mapping and recommending as described herein. In one aspect, an associated memory storage device 52 receives and stores program code 54 including the functions and procedures 57 that are accessed by the hardware processor device 55 for configuring the hardware processor device 55 to build a paint color recommendation model for mapping received user color paint selections and user cognitive contexts 45 to a color/pigment(s).

As the tool 30 receives from a vendor and/or its customer the customer's initial base color/pigment selections, including associated user Percept data 18, user cognitive Context data 28 and Environment measures data 29 of the room or environment to be painted (referred to herein as "P/C/E data"), this data is stored in one or more memory storage devices making up database 35 and this data is accessed via a local network, e.g., private or public network 99, via a network input/output 40 interface for use by the hardware processor device 55 in building/applying the model.

In this aspect, associated memory storage device 52 receives and stores program code 58 including functions and procedures that are accessed by the hardware processor device 55 for configuring the hardware processor device 55 to apply a learned sparse regression model and communicate a pigment recommendation output 49 for a vendor 20 or that vendor's customer via an interface display device 60 at the vendor.

Figure 4A:
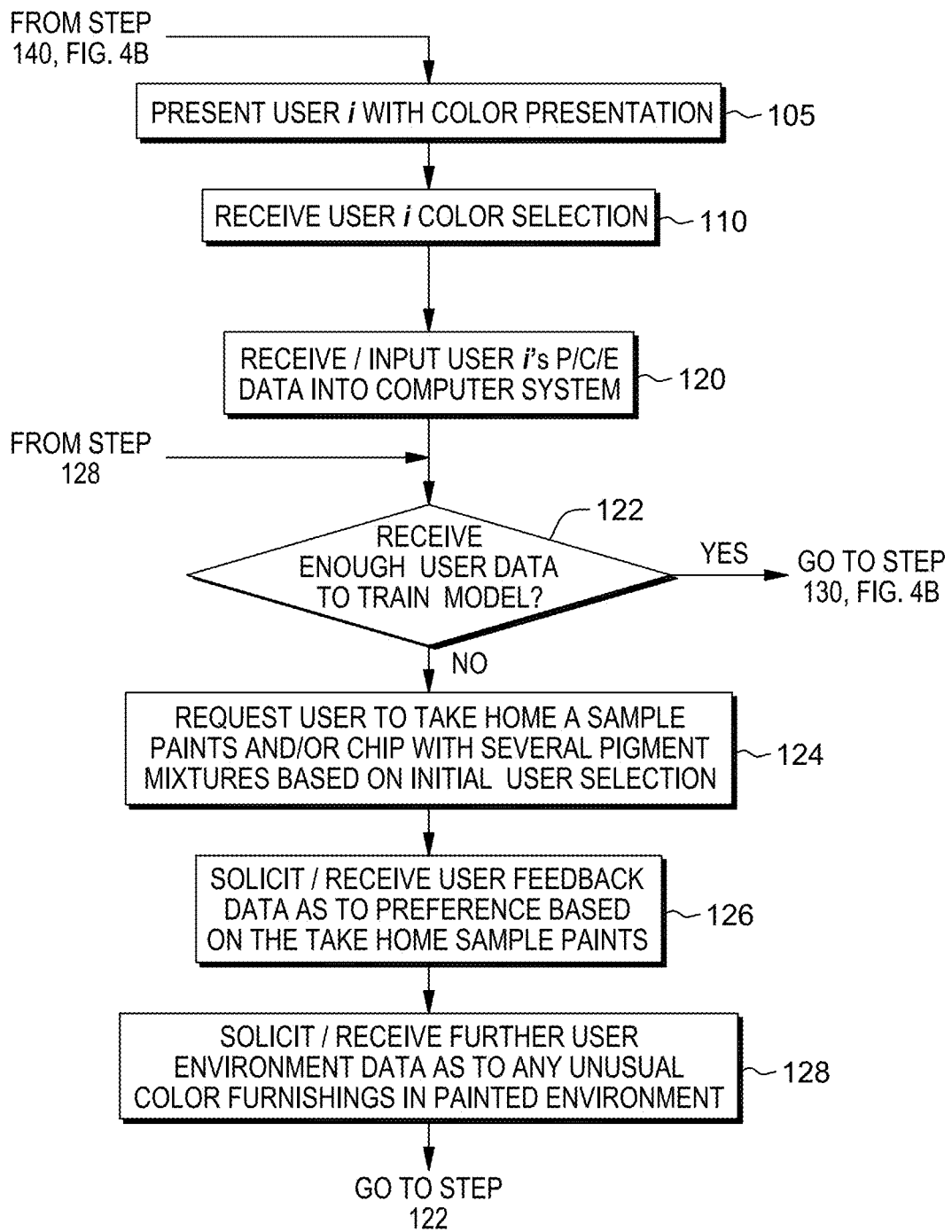
FIG. 4A-4B generally depicts a color paint recommending process used to build a recommendation model according to one embodiment.

As shown, the hardware processor 55 accesses data in the memory storage device 52 and databases 35. In one embodiment, a continuous model build procedure is run as shown in FIG. 4A. For the model build, the hardware processor 55 is configured to receive the following initial inputs: a user's color/pigment selection, and profile information associated with that user. The method 100 depicted in FIG. 4A illustrates the processing at the tool 30, or the paint vendor, for building the trans-vendor paint selection/recommendation service model.

The method depicted in FIG. 4A at step 105 first includes receiving the user at the paint vendor location (store or premises) and presenting the user (e.g., User i) with a presentation and interface means to view and select a desired color. As an example embodiment, as shown in FIG. 2, the User i is optionally located in a controlled light environment, e.g., in a controlled light environment such as in a separate room or kiosk, a paint vendor 20 program running on a computing device 21 generates and presents via interface display device 60, an artificial context of a color wheel 75 (or like color presentation) that a user may interact with and/or select from. Particularly, via the interface 60, the user may first select a color or color/pigment from the wheel presented that the user likes. FIG. 2A depicts a zoomed in portion 80 of the color wheel 75 in FIG. 2 where user-selected colors are indicated as example circles 85 on the color wheel. As known, any color that may be selected by the user via the color wheel is mapped to a known base color and/or corresponding unique combination of one or more color pigments.

Returning to FIG. 4A at step 110, the user selected color, e.g., "cornsilk", and/or its known corresponding base color and pigment mixture information is communicated over a communications network from the vendor premises to the tool 30 for processing and storage associated with the user. In an alternate embodiment, the user may be presented with portable paint chips showing paint color and pigment variations thereof. However, the user selected color data and pigment mixture is likewise communicated over a communications network from the vendor premises to the tool 30 for processing and storage associated with the user.

Concurrently, or subsequently, the user may be asked to provide that user's P/C/E data with their initial color selection. Thus, at step 120, FIG. 4, the user may input, and the system tool 30 further receives User i's P/C/E data information (i.e., user percept, cognitive context and environmental measure's data) into the computer system to the extent it is available.

Thus, as shown in FIG. 3, besides the initial user color selections, additional inputs to train the model include: a user's profile information or context data 18 associated with that user, measures data 28 associated with that user's environment, and user cognitive context data 29. Example user profile information 18 may include, but is not limited to: that user's age, gender, socioeconomic status, etc. The vendor may even administer a color test so as to test that user's psychophysics such as: color matching tests (e.g., Rayleigh match test), color vision acuity tests (e.g., Farnsworth-Munsell 100 hue test that belongs to the group of hue discrimination tests, also called arrangement tests.), or color blindness tests (e.g., Ishihara Test of a color, which is a perception test for red-green color deficiencies). Thus, context data 29 entered into the system may represent results of a short psychophysical assessment of the user's color perception such as components of that user's corresponding color perception which may be administered to the user, e.g., while at the vendor premises. The administration of such color tests may also be performed in the office of a healthcare professional, at a user's home, etc., and the results stored in a secure database for later use.

User profile or context information 18 may alternately or additionally include a color photograph, color picture or a recorded or real-time video image feed of the user's room or environment that is to be painted.

Additional inputs to train the model include: measures data 28 including environmental measures data including, for example, the average ambient or average light levels, e.g., obtained over a course of a day, of the room or environment that is to be painted; and measures data 29 of the user's cognitive context, i.e., color discrimination and user's color perception (e.g., as administered such as via a device by the vendor, or as data supplied by the user). Based on these inputs: image feed 18, environment measures 28, and user cognitive context measures 29, the processor device 55 of the tool 30 performs specific method steps to train a color assignment/prediction model.

In a further embodiment, besides measures data 28 of the user's color discrimination and perception, the measures 29 received by the system include measures of the user's cognitive context that may be provided by social network information, including, but not limited to: that user's purchase history of art and design goods which is reflective of that user's interest in art, that user's purchase history of music which is reflective of that user's interest in music; and/or that user's purchase history of reading material which is reflective of that user's interest in books. This social network information from a user may be obtained by accessing a social network infrastructure 90 such as shown in FIG. 1 and conducting searches for user's context in social networking sites such as Facebook®, Myspace®, Instagram®, Twitter®, Google®, etc.

For example, as mentioned, a user's social network may include friends and family or even business colleagues. The identification of members in a social network may be performed by an analysis (with users' permissions) of posts to social media, emails, LinkedIn® connections, etc. Tools such as the Sentinel Visualizer also make it possible to perform sophisticated analyses of the nature of social network connections, including such measures such as measures of "degree centrality," "hub," and "authority."

It is understood that the extracting social network profile information, and relatedness to different individuals in the social network according to network metrics and techniques known in the art (e.g., network centrality, degrees-in, degrees-out), may be applied to derive additional information about user P/C/E. Specifically, information pertaining to color perception, preference, and contextual influences may be extracted, for example based on user's social network purchasing history, likes and dislikes, background choices, and results from psychometric tests of color perception "shared" using standard social networking interfaces.

Returning to FIG. 1, in one embodiment, a paint vendor at a retail location may provide their users or customers with an "app" (a software application for user's smart phones) that may be operated on a user device, e.g. a mobile computer, smartphone, or PDA 12c. Such a mobile phone may include a camera that the "app" 48 configures as a sensor that functions to measure and record the average ambient lighting in a room or environment to be painted. The environmental measurement data of such average ambient lighting in the room over a period of time, e.g., during a day, may be obtained and subsequently provided to the paint vendor or provided directly as input to the system modeling tool, e.g., via a web-based communication. In addition, a photograph of the room may provide contextual clues to the app about the expected subjective perception of the paint color on the walls of the room.

In one embodiment, as shown in FIG. 3, during the model build, image and user profile data 18 and user context and measures data 28, 29 may be received in real-time over communications path 45 such as via a communication over a network 99 such as the Internet, by the machine learning engine 57, and/or may be obtained from the data storage repositories or context databases 35. The processor 55 may, in one embodiment, directly receive and buffer the input user profile, context and measures data from the memory 52, or from local or remote (external) databases 35.

In one embodiment, environment or user measures inputs 28, 29 are obtained by the processor 55 from a local or remote repository through a network via mechanisms such as APIs (application programming interfaces), web-services, etc.

Then, continuing in FIG. 4A, at 122, the tool 30 is programmed to determine whether there is enough user context data provided to contribute and sufficiently train the model. If there is enough user context data received at step 120 to train and contribute to the model, then the process proceeds to step 130, FIG. 4B in order to implement functions and routines in the engine 57 to map the received user data to a standard color space and train the model.

If, at 122, it is determined that there is not enough user context data to train the model, then the User i may be asked to provide additional context information for their selection. For example, the method may continue at step 124, FIG. 4 where the tool or vendor may request that the User i take home actual sample paints and associated pigments according to a paint chip corresponding to the initial user pigment selection, e.g., "cornsilk", and apply them on the wall or environment to be painted. For example, based on an initial user selection of "cornsilk" the user may be asked to take home and apply other pigment variations "cornsilk double prime", or "cornsilk triple prime" to the wall/room or environment.

Then, as represented at 126, system tool 30 further solicits and receives User i's feedback data as to the user's preference after applying the take home sample paints.

Then, as represented at 128, system tool 30 may further solicit and receive User i's feedback data such as, for example, the presence of any "unusual" color furnishings or features to be located in the User i's painted environment, e.g., after applying the take home sample paints.

Figure 4B:
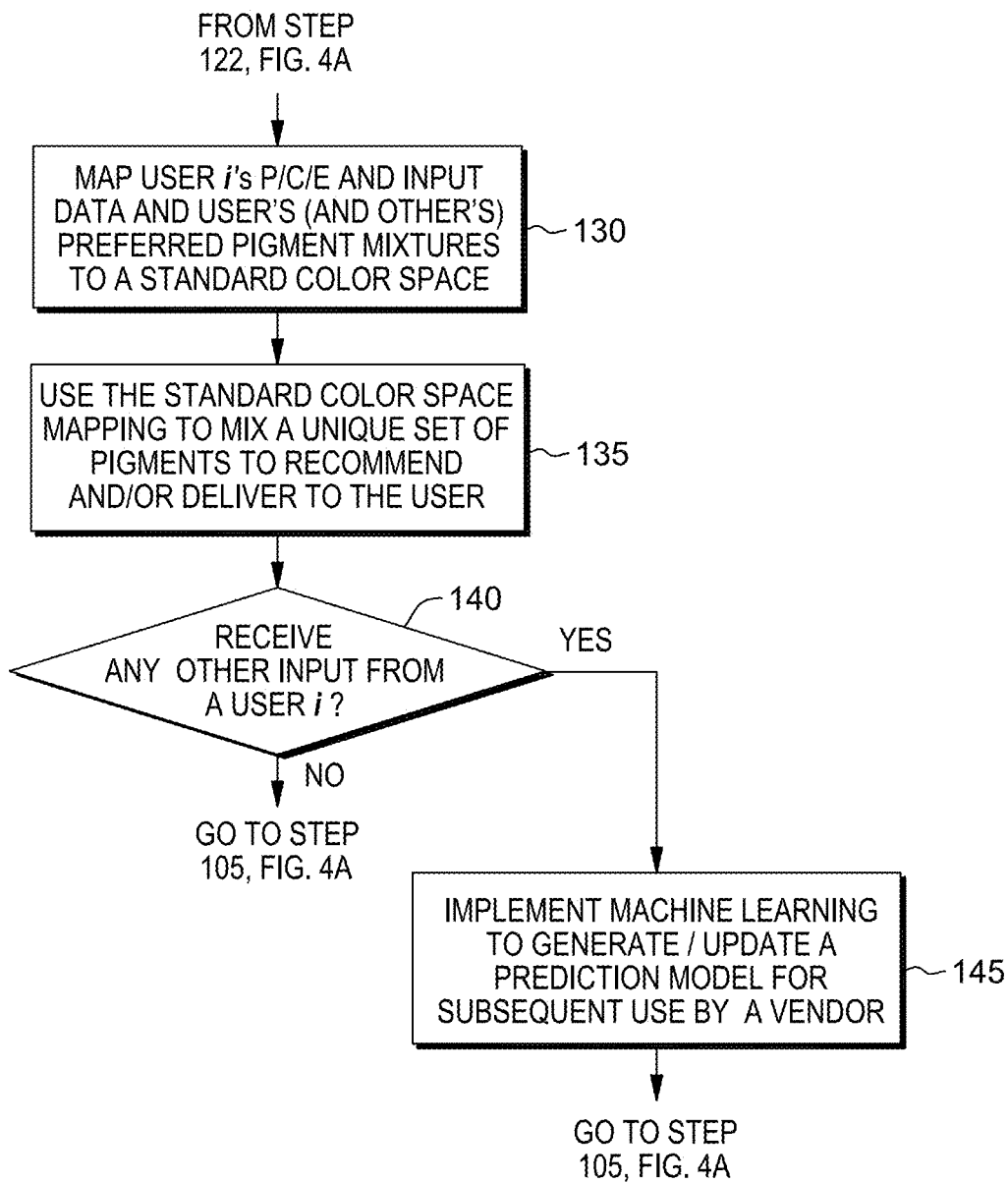

Then, the system returns to step 122 to ensure that the collected P/C/E data for User i including the feedback data collected at steps 124-128 is sufficient for use in parameterizing and training the model which is performed next at step 130, FIG. 4B by implementing functions and routines in the engine 57 to map the received feedback data to the standard color space and train the model.

Thus, at step 130, FIG. 4B, in one embodiment, the functions and procedures 57 in the program code 54 implement a sparse regression modeling technique to map user i's P/C/E/ data and user input data (e.g., user profile data) and the user's preferred (initial) pigment mixture to a standard color space (i.e., a standard measure of wavelengths that are reflected by a certain pigment mixture). This data representing the mapped pigment mixture may be used for physically mixing a paint pigment color. Returning to FIG. 3, in one embodiment, the tool 30 additionally shows in the memory 52 a machine learning engine 57 comprising known program code, functions, sub-routines and procedures for implementing supervised or semi-supervised machine learning. These routines use a sparse regression technique to map these measures together with pigment mixtures to a standard color space, e.g., a color wheel. Using the sparse regression learning techniques, a sparse feature matrix is learned by the trans-vendor service for multiple users. Subsequently, the sparse feature matrix learned by the trans-vendor service for multiple users may be applied for a given user to the problem of assisting him or her to choose a color. For certain users, sparse features may include a strongly weighted psycho-physical component based on color vision acuity, and the average chromaticity of textiles in the room; for other users, the sparse features may include strongly weighted social network background color choices for their online "sites" and the range of lighting conditions measured in the room.

Continuing to step 135, assuming that the tool's model is partially or fully trained, then the process may recommend at 135 a color/pigment combination for the User i that reflect that user's initial color selection and P/C/E data. Thus, at step 135, FIG. 4B, the tool may use the standard color space mapping to physically mix a unique set of pigments to recommend to the vendor and/or to physically deliver to the user for application to the wall and/or environments for that user. Thus, the user may physically receive the actual color paint/pigment mixture based on the mapped unique set of pigments determined by the model.

Continuing at FIG. 4B, step 140, the processor then determines whether any more input (context) is received for a User i (i.e., the same user, or a new user). If additional input is received, then the system performs updating of the model. That is, at step 145, FIG. 4B, using the received User i information, and by implementing supervised or semi-supervised machine learning, including the applied sparse regression techniques, the method performs an updating (or a generating) of the color prediction model implemented as tool 30 in FIG. 1.

Thus, for example, at step 140, further context data for a User i may be subsequently received and the process will perform model updating at 145. As an example, at 130, once a User i has purchased a color paint/pigment as recommended by the tool 30, a questionnaire may be generated and subsequently presented to the User i, such as via a user's display on a computing device, to elicit further feedback from User i, in the form of that User i's satisfaction level. That is, after the customer has painted the walls of the room or environment, feedback is elicited from the customer to indicate whether that chosen paint color on their walls has "matched" their initial color chosen at the store. This satisfaction level is communicated to the vendor and ultimately the tool receives this data, records this data for the User i and is further input into the model and used to update the model (e.g., apply a positive or negative label) such as at step 145. Questionnaires may include, but are not limited to: overall rating scales for the degree of match (e.g., 10-Perfect Match to 1-Completely Incorrect Match). Questionnaires may also include questions aimed at measuring defects in the space of hue and saturation (e.g., using questions such as "Is the color correct but it appears too vivid or too 'muddy'?; "Is the shading of the color correct, but it appears too green, too red, or too blue?").

It should be understood that user feedback may be elicited by online surveys and by other means. For example, a survey may ask a user to indicate his or her satisfaction level on a scale from 1 to 10. More nuanced information may be obtained by using more intricate questionnaires, that may include GUI elements such as sliders. Other parameters in such questionnaires could include ratings of glossiness, durability, ability of one paint to cover another paint, color of paint when viewed in bright sunshine, etc.

Afterwards, the method returns to step 105, FIG. 4A to process any new paint-vendor input user selections.

In one embodiment, updating of the model at step 145 includes the generating of a sparse feature matrix which is a data structure reflecting the users context data and pigment selections weighted according to sparse learning over positive or negative labels, e.g., reflecting a user's satisfaction data. All measures that are taken by the system because they may be useful in predicting the mapping of color selection into pigments are included in a measurement matrix. This sparse feature matrix may be subsequently used by that vendor or any other paint vendor (i.e., as a trans-vendor service) who use want to use the model provided by the color recommending service. Learning involves setting coefficients in the feature matrix such that they satisfy a sparsity constraint (i.e., as many coefficients as possible are set to zero), and such that those measures with large coefficients represent those measures that are important for predicting a match.

As a paint color and color pigment combination may look different once applied at the user's wall or environment, the machine learning (semi-supervised or supervised) is used to account for this user context and perhaps recommend a modified color/pigment for the selected color as will be explained in further detail herein below.

That is, in one embodiment, based on the P/C/E and base color/pigment selection data and a user satisfaction level collected, the machine learning component 57 of tool 30 generates a meaningful feature matrix that may be subsequently used for prediction based on all the customer datum (e.g., user profile, user cognitive context and environmental measures) received over time. This meaningful matrix will accurately represent the user's expected color percept, e.g., at the home or environment by predicting user labels most likely after the paint is applied and, for example, a questionnaire about customer satisfaction is administered. This model is configured to now predict and recommend a most accurate color/pigment combination providing the customer with an increased user satisfaction level based on the initial user-selected color from the color wheel or paint chip selected at the vendor location and the ultimate context in which that paint will be spread on a wall.

Returning to step 140, FIG. 4B, if it is determined that no other inputs have been received from User i, then the process proceeds back to step 105 to wait for a new color/pigment selection input and new associated P/C/E input data associated with a new user (e.g., User$_{i+1}$) and the steps 110 through 135 repeated for model build/updating at step 145 with the new user information.

Thus, using method 100, the hardware processor 55 receives the P/C/E inputs from a user to get the correct pigment combination to accord with the user's color percept in that user's home or environment. Then, to properly train the model, besides the user's initial base color paint and pigment selections, the additional information is needed to ensure that the user's color "percept" of their initial selection at the vendor store or premises matches that user's percept of that color when that paint is spread on a wall in their room or environment. Such additional training information includes all other things that contributed to that context in which the user has become satisfied that the chosen paint color on their walls has "matched" their initial color chosen at step 110 from the color wheel or paint chip at the vendor location. For example, while a user may have selected "cornsilk" as a color at the paint vendor store, the user may be provided with a color chip that includes additional degrees of shade, e.g., "cornsilk prime", "cornsilk double prime", or "cornsilk triple prime", or may even be provided with take home paint samples of each of these colors samples to apply to the room, etc. When the paint is ultimately applied to the room or environment, the user may be satisfied with the "cornsilk triple prime" selection even though that user initially selected "cornsilk" based on the user percept when at the vendor store or location. The additional user context that contributed to that user's selection of "cornsilk triple prime" rather than the initial selection of "cornsilk" is captured by the tool 30 and used for training the model.

The system 10 and method 100 of FIGS. 4A-4B continuously performs sparse regression and, in one embodiment, using supervised learning techniques, performs feature learning over the historical and current data from multiple users (e.g., based on each their P/C/E context, profile and initial pigment mixture selection), their (user's) purchases of paint pigments and base paints, and their (user's) feedback to the vendor in the form of questionnaire answers, follow up repainting, and/or returns of paints to the store.

The system thus fits a linear model to data where the number of observations (e.g., observations of paint pigment/base purchases followed by either approval or disapproval ratings on the resulting color) to variables (e.g., measures of a user's perceptual/cognitive/environmental, or a user's perceptual/cognitive/environmental (P/C/E) context, and the indicated target color in the artificial context of the color wheel, e.g., collected at the time of purchase).

Training the model in this way ensures color selection predictability for future users that choose a similar color and that have similar contexts. For example, for a subsequent user that initially chooses the "cornsilk" color at a paint store and who has indicated similar contextual information (e.g., same or similar color percept) as prior users who had had their similar "cornsilk" selections mapped to a pigment mixture referred to in this model as "cornsilk triple prime", the vendor using the tool 30 and applying the model to the subsequent user's color selection and context may ultimately predict and/or recommend to that subsequent user, e.g., at the paint vendor display device or via a user interface at a user device 12a, . . . , 12n, a "cornsilk triple prime" pigment mixture based on that user's context when similar to the earlier user(s) who had input similar context(s). Thus, it is understood that the model predicts perceived color from color selection, given users' P/C/E data. It additionally predicts pigment mixture to match perceived color to color selection.

In one embodiment, the system and methods implemented by computation processor 55 builds a model that finds causes for a perceived color from data measures other than pigment identity. For example, based on this input measures and cognitive context datum, the hardware processor device 55 using learning engine 57 builds a model to solve a problem by providing a mapping of: 1. components of the painted environment; 2. components of the user's perceptual apparatus; and 3. components of the user's cognitive context to one or more of: 1. the color wheel location or mixture of wavelengths corresponding to a desired color in the environment; 2. the mixture of pigments corresponding to a desired wavelength of light sufficient to produce the desired color; and 3. the base paint into which pigments are mixed necessary to provide additional context for the subjective experience to emerge. Because the number of measures will far exceed the number of observed percepts or preferences of any given user, the performed method 100 performs a sparse regression from measures into a standard color space such as a color wheel, targeting these colors with pigments and base paints that the system learns are capable of generating the desired color in the environment.

In effect, the systems and methods intervene between the selection of the paint chip and the corresponding unique mixture of base paint and known combination of pigments to adjust the pigments and base paint according to the ultimate user context in which the paint will be spread on a wall in the room or environment.

In a further aspect, a method of implementing the trans-vendor paint color recommendation service implementing the built model is provided. That is, as shown in FIG. 1, in one embodiment, a system implementing trans-vendor service tool 30 may provide an interface that is physically implemented at each paint vendor, store or service location 20a, 20b, . . . , 20n such as shown in FIG. 2 in which the tool 30 may receive a request in person from the customer/user desirous of painting a room or environment and implement the model for predicting and/or recommending a color pigment. Otherwise, the system may receive a paint color request over a computer network from a user whose room or environment is to be painted.

Figure 5:
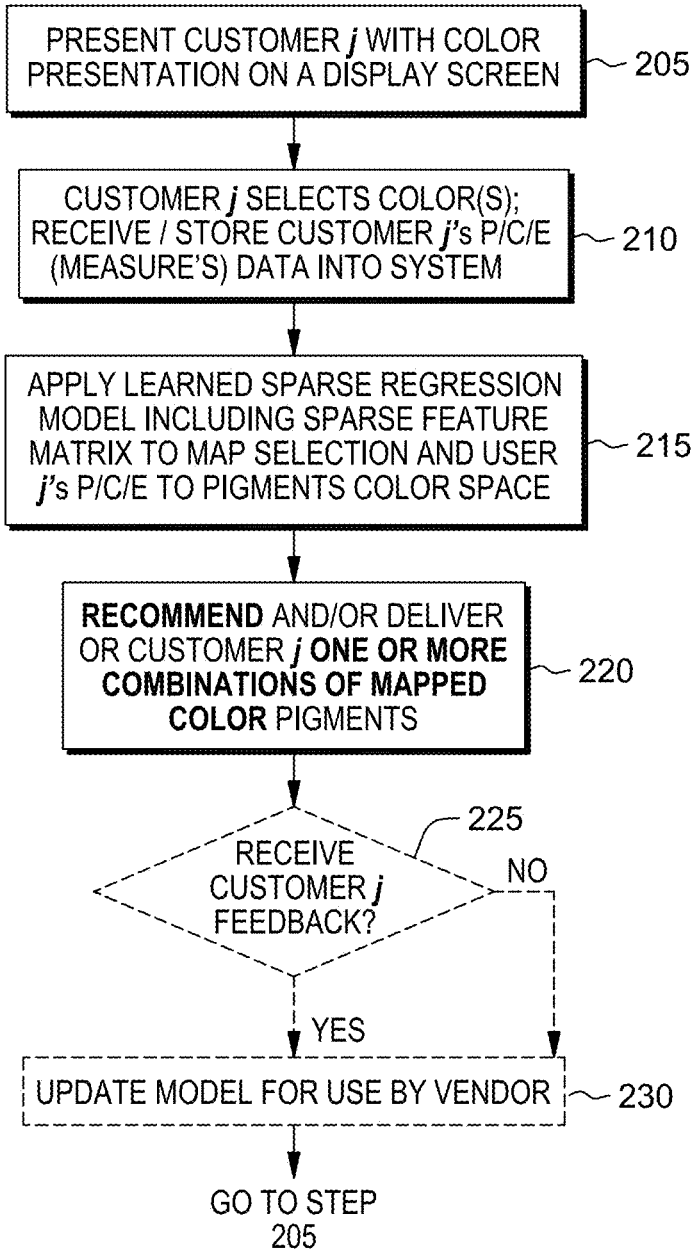
FIG. 5 generally depicts a color paint recommending process used to recommend paint color selection by applying the built recommendation model according to one embodiment.

FIG. 5 depicts a method 200 implemented by the tool 30 to provide a paint color/pigment recommendation for the user. Similar to steps 105 to 135 of FIG. 4, the method 200 includes steps of using the model to recommend a color pigment to a customer. Over time, as the model is used and given much user context data, the model is adjusted. A first step 205, FIG. 5 shows the presenting to a Customer j with a paint chip or a color presentation wheel 75 on a display of a computer display device 60 at the paint vendor premises or store via which the user may select a base color/pigment as shown in FIG. 2A. Then at 210, the tool 30 and model (implemented in the tool) receives and stores the base color/pigment selection and corresponding paint pigment combination data by customer j. Additionally, subsequently, or at the same time, at 210, the tool and model further receives and stores the customer j's P/C/E (profile, context and environment measure's) data into the system. In one embodiment, the image and user profile data 18 and context and measures data 28, 29 may be received in real-time, e.g., over communications path 45 for input to the machine learning engine 57, or may be subsequently obtained and stored in web-based data repositories or context databases 35 such as available for communication over a network 99 such as the Internet. The processor 55 may, in one embodiment, directly receive and buffer the input user profile, context and measures data from the memory 52, or from local or remote (external) databases 35.

Then, at 215, FIG. 5, the method includes applying the built learned sparse regression model including sparse feature matrix to map the customer j's initial color selection and any customer j's P/C/E data to the standard (pigments) color space. That is, from the user selected color/pigment from the display, and using the previously learned sparse regression model, the tool 30 maps the selection, together with the user's P/C/E data back to the color/pigments space, where it is presumed the pigments will produce the desired color.

Then, FIG. 5, at step 220, the applied model incorporating the built sparse feature matrix in tool 30 uses the standard color space mapping to recommend to and/or mix a unique set of pigments for delivery to the Customer j for that customer's purpose. That is, in one embodiment, as shown in FIG. 3, the hardware processor 55 applies the model and initiates generation of output signals 49 representing a recommended color and pigment type, e.g., for presentation via a user display device such as a hand held touch screen or display device 60 (e.g., of FIG. 2). The recommended pigment may be the same as initially chosen by the customer, or may be modified based on the received customer's contextual data.

Such signals 49 may be provided to the user via a display terminal 60 of FIG. 2 while at the vendor location, or, may be sent to any other user device, e.g., via a network connection, an e-mail, phone/text message, or any other communication modality. Such signals may also be recorded and used to generate color data for use in physically mixing the color paint based on the mapped base color and color pigment for the user as determined by the model outputs. For example, in one embodiment, the signals 49 representing the mapped color pigment may be received by the vendor directly, and automatically may be used directly to physically mix a sample of paint at that pigment for the user to purchase or sample.

In a further embodiment, based on the received initial color pigments and customer's P/C/E contextual data, it may be determined that the model may not have learned enough (i.e., is not fully trained) and determines that not enough information is available to adequately map the user data into the color space. In such a scenario, for example, the system may recommend that two (or more) physical samples be produced based on the initially pigment choices for the user to bring home and apply to the wall or environment to obtain a user feedback, e.g., a user preference, which feedback data can be used to update the model.

Thus, returning to step 225, FIG. 5, the vendor/tool may receive feedback from Customer j, for example, an indication of a satisfaction level (or not), or a preference of a particular pigment out of the several physical samples that were recommended and/or supplied to the customer. Regardless of whether feedback data from the Customer j is received or not, the information obtained by the tool 30 in the processing of this Customer j is used to update the model for subsequent use by the vendor at 230. The method will wait for a further user and the method returns to step 205, FIG. 5.

Thus, based on the received P/C/E data, e.g., an image and measure's data also received from the user, the trans-vendor service is enabled to provide to the user, e.g., via a display, or to a user device over the computer network, a recommended color and pigment types.

Given the base color and known pigment mixture combination to achieve a selected color, in the tool 30, other inputs are used to modify the pigment combination that will achieve a user's or multiple user's percept in the home or environment context.

The trans-vendor tool 30 thus obtains measures such as a user's context of viewing based on a set of parameters assigned to the vendor and provided to a customer to elicit their responses for consistent use across all vendors based on inputs from all users so the tool could be used for all vendors.

The vendor's use of the built model ensures that paint returns and customer dissatisfaction with the outcome will be minimized. That is, the service 10 ensures that the user's P/C/E context will create the qualitative experience of the chosen and desired color, since a sparse regression is designed to fit all of the user's P/C/E inputs and all available pigments to the space of desired colors. The system therefore maximizes user satisfaction with the resulting painted environment, a value proposition that paint vendors would greatly benefit from.

In one embodiment, in tool 30, a sparse regression technique known in the art as "LASSO" may be used to build the trans-vendor paint recommendation model. Thus, procedures and functions for model build/update may include that program code for performing a LASSO regression technique. In one embodiment, a sparse regression technique is implemented wherein the system is constrained to create a model to predict the label by making weights on the measure sparse. One LASSO regression technique that can be used is described in "A tutorial on the Lasso approach to sparse modeling," by Morten Arendt Rasmussen and Rasmus Bro, Chemometrics and Intelligent Laboratory Systems 119 (2012) 21-31, incorporated by reference herein.

For the LASSO mapping procedure performed by computing system tool 30, a linear regression problem may be represented according to the following equation:

$$y = Xb + e,$$

where X (e.g., is a n×p matrix) and y (e.g., an n×1 vector) are known and b (e.g., a p×1 vector) is unknown, and e is an error measure. Lasso sparse regression aims to find an estimate of the regression vector (b) with good predictive performance which is sparse (i.e., a number of elements of b are exactly zero). It is understood that other methods exist and can be implemented for achieving sparse solutions: setting small coefficients of regression vector b to zero (hard thresholding), forward stepwise addition of variables that increase performance the most, backward elimination of the least significant parameters, etc. In LASSO, there is implemented use of a "L1 norm" penalty as a means to obtain sparse solutions. The L1 norm refers to the sum of absolute values of a vector and in LASSO an L1 norm constraint is used for regression purposes. In this embodiment, vector y is the mapped color space or pigment space. The X matrix includes, for example, the P/C/E user context measures, the paint chip color dimension (users selections of the pigments), and the y vector includes the values that are being predicted and includes the labels (or a precursor to the label) that is used to make a classification or categorization based on the inputs in the matrix X. The regression vector "b" is to be solved using the LASSO sparse regression technique to obtain/update the set of coefficients used for the model recommending.

Thus, to implement Lasso, multiple variables are measured, including paint selection, pigments identity, base paint identity, lighting conditions of sample viewing, lighting conditions of home (e.g., could be over several days/seasons), clutter of scene surrounding painted surface, furnishing types and colors, address, type of home, age/gender/socioeconomics of viewer, psychological profile of viewer, and so on, which populate the X matrix. The task then is to regress all of these variables against the viewer's perceived color (labels of y vector). To do this mapping, multiple samples may be generated to paint the wall, each a variation on the sample selected at the paint store. When the viewer chooses one, this becomes training data that says: given the original selection and multiple measures, this is the pigment combination that produces the desired color perception.

In one embodiment, it is assumed that color is not a mixture of pigments, or even a mixture of wavelengths. It is a subjective percept and the methods described herein aim to match that in the context of the viewer viewing a painted wall to the selection mechanism.

The trans-vendor tool 30 thus obtains measures such as context of viewing which can be a set of parameters assigned to a vendor for assignment to a customer for consistent use across all vendors based on inputs from all so the tool could be used for all vendors.

Figure 6:
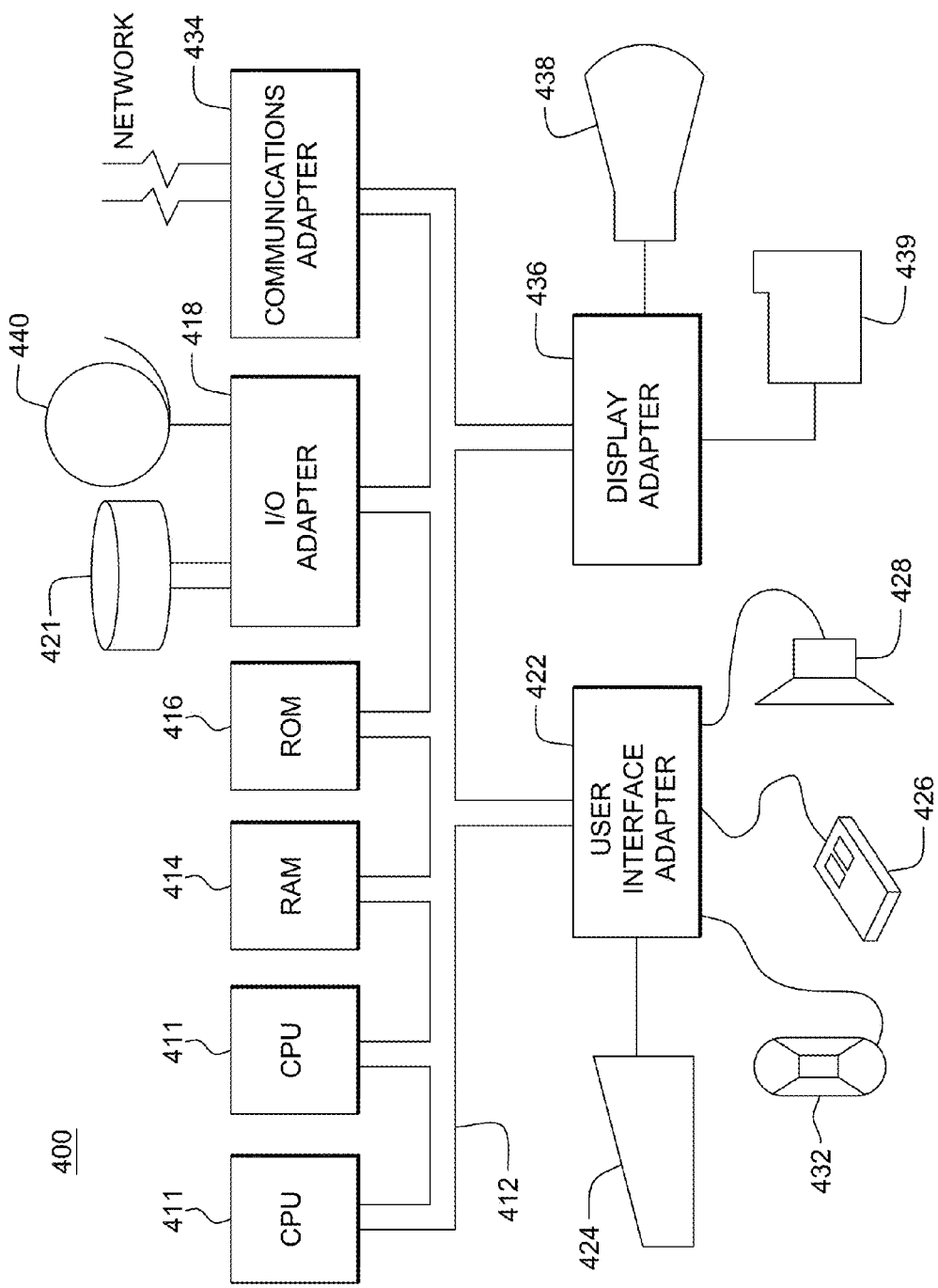
FIG. 6 depicts an exemplary hardware configuration for performing methods such as described in FIGS. 4A-4B and 5 in one embodiment.

FIG. 6 illustrates one embodiment of an exemplary hardware configuration of a computing system 400 programmed to perform the method steps for implementing a trans-vendor paint recommendation service as described herein with respect to FIGS. 4A-4B and 5. The hardware configuration preferably has at least one processor or central processing unit (CPU) 411. The CPUs 411 are interconnected via a system bus 412 to a random access memory (RAM) 414, read-only memory (ROM) 416, input/output (I/O) adapter 418 (for connecting peripheral devices such as disk units 421 and tape drives 440 to the bus 412), user interface adapter 422 (for connecting a keyboard 424, mouse 426, speaker 428, microphone 432, and/or other user interface device to the bus 412), a communication adapter 434 for connecting the system 400 to a data processing network, the Internet, an Intranet, a local area network (LAN), etc., and a display adapter 436 for connecting the bus 412 to a display device 438 and/or printer 439 (e.g., a digital printer of the like).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A paint color recommendation system for multiple paint vendors, said system comprising:
 a memory storage device storing a program of instructions;
 a processor device receiving said program of instructions to configure said processor device to:
  receive input data representing an initial paint color or pigment selection from a user;
  receive further input data representing one or more of a user's perceptual/cognitive/environmental (P/C/E) context;
  train, using a machine learning technique, a sparse regression model to received input data from multiple user's including each user's initial color paint and color pigment selection data, received user profile data, a received user context data, and a received measures data to generate a sparse matrix;
  map, using the generated sparse matrix, said user's initial paint color or pigment selection and user context data to a pigments color space;
  determine, based on said map, a color pigment or pigment mixture from said pigments color space for recommendation to the user; and
  communicate data representing said color pigment or mixture recommendation to a device.

2. The paint color recommendation system of claim 1, wherein said context may include the user's cognitive context obtained from social network information, said processor device being further configured to:
 conduct a search in a social networking site or network infrastructure to obtain user context information comprising one or more of: the user's interest in art, design goods, music and reading material, and the user's purchase history of art and design goods, music and reading material.

3. The paint color recommendation system of claim 2, wherein said color pigment recommendation data specifies a unique combination of and amounts of paint colors and color pigments, said paint vendor using said specified color pigment recommendation data to mix a test supply of color paint of the recommended color pigment for said user.

4. The paint color recommendation system of claim 3, wherein said user applies said test supply of color paint of the recommended color pigment data to applies said supplied paint to said environment, said processor device is further configured to:
 receive from said user a feedback data representing a degree of satisfaction that the recommended color pigment applied to the user environment has matched the user's initial color paint and color pigment selection; and
 update said learned model with a positive or negative label based on said received user feedback data.

5. The paint color recommendation system of claim 4, wherein to update said learned model, said processor device is further configured to:
 apply, in the model, a positive label to an output recommended color pigment or pigment mixture based on a received favorable user feedback data, associated with the received input initial color paint and color pigment selection, and said one or more user P/C/E context data.

6. The paint color recommendation system of claim 1, wherein said processor device is configured to receive user profile data representing one or more of: a gender, a socio-economic status; an age of said user.

7. The paint color recommendation system of claim 1, wherein said processor device is configured to receive user context data representing one or more of:
 a picture or real-time image of a room or environment to be painted with said color paint and color pigment selection;
 a result of an administered psychophysical assessment of the user's color perception to obtain components of the user's color perception; and
 a measure associated with a feature of an environment in which the selected paint color is to be applied to a surface thereof.

8. The paint color recommendation system of claim 7, wherein said measure associated with a feature of an environment to be painted comprises one or more of:
 an average ambient light level as recorded over a period of time of a room or environment; and
 an amount and color of items or furnishings to be located in said room or environment to be painted with a color paint and color pigment selection.

9. The paint color recommendation system of claim 1, wherein to map said user's initial color paint and color pigment selection, said user context, and environment measure data to a pigments color space, said processor device is further configured to:
 map one or more color components of the painted environment, a measure of the user's color perception, and components of the user's context to one or more of: a mixture of wavelengths corresponding to a desired color, a mixture of pigments corresponding to a desired wavelength of light sufficient to produce a desired color, and a base paint into which pigments are mixed.

10. A computer program product comprising a computer readable storage medium tangibly embodying a program of instructions executable by the computer for recommending paint color for multiple paint vendors, the program of instructions, when executing, performing the following steps:
 receiving input data representing an initial paint color or pigment selection from a user;
 receiving further input data representing one or more of a user's perceptual/cognitive/environmental (P/C/E) context, a user's environmental context associated with an environment in which the selected paint color is to be applied to a surface thereof;
 training, using a machine learning technique, a sparse regression model to received input data from multiple user's including each user's initial color paint and color pigment selection data, received user profile, received user context data, and received measures data to generate a sparse matrix;
 mapping, using the generated sparse matrix, said user's initial paint color or pigment selection and user context data to a pigments color space;

determining, based on said map, a color pigment or pigment mixture from said pigments color space for recommendation to the user; and communicating data representing said color pigment or mixture recommendation to a device.

11. The computer program product of claim 10, wherein said context may include the user's cognitive context obtained from social network information, said method further comprising:

conducting a search in a social networking site or network infrastructure to obtain user context information comprising one or more of: the user's interest in art, design goods, music and reading material, and the user's purchase history of art and design goods, music and reading material.

12. The computer program product of claim 11, wherein said color pigment recommendation data specifies a unique combination of and amounts of paint colors and color pigments, said paint vendor using said specified color pigment recommendation data to mix a test supply of color paint of the recommended color pigment for said user, wherein said user applies said test supply of color paint of the recommended color pigment data to a surface within said environment, said method further comprising:

receiving from said user a feedback data representing a degree of satisfaction that the recommended color pigment from said test supply and applied to the user environment has matched the user's initial color paint and color pigment selection; and updating said learned model with a positive or negative label based on said received user feedback data.

13. The computer program product of claim 12, wherein said updating said learned model comprises:

applying, in the model, a positive label to an output recommended color pigment or pigment mixture based on a received favorable user feedback data, associated with the received input initial color paint and color pigment selection, and said one or more user P/C/E context data.

14. The computer program product of claim 10, wherein said method further comprises:

receiving user profile data representing one or more of: a gender, a socioeconomic status; an age of said user.

15. The computer program product of claim 10, wherein said method further comprises:

receiving user context data representing one or more of:

a picture or real-time image of a room or environment to be painted with said color paint and color pigment selection;

a result of an administered psychophysical assessment of the user's color perception to obtain components of the user's color perception; and a measure associated with a feature of an environment in which the selected paint color is to be applied to a surface thereof.

16. The computer program product of claim 10, wherein said method further comprises:

receiving environment measure data representing one or more of:

an ambient light level as recorded over a period of time of a room or environment to be painted with a color paint and color pigment selection; and an amount and color of items to be located in said room or environment to be painted with a color paint and color pigment selection.

17. The computer program product of claim 10, wherein said mapping of said user's initial color paint and color pigment selection, said user context, and environment measure data to a pigments color space further comprises:

mapping one or more color components of the painted environment, a measure of the user's color perception, and components of the user's context to one or more of: a mixture of wavelengths corresponding to a desired color, a mixture of pigments corresponding to a desired wavelength of light sufficient to produce the desired color, and a base paint into which pigments are mixed.

* * * * *